Patented Oct. 16, 1951

2,571,656

UNITED STATES PATENT OFFICE 2,571,656

METHOD OF PREPARING PHOSPHORIC ACID ESTERS

Alan Bell and Kent C. Brannock, Kingsport, Tenn., assignors to Eastman Kodak Company, Rochester, N. Y., a corporation of New Jersey No Drawing. Application February 9, 1948, Serial No. 7,296

12 Claims. (Cl. 260—461)

This invention relates to the preparation of phosphoric acid esters especially having mixed substituents in which a tetra alkyl, tetra aryl or mixed pyrophosphate or pyrothiophosphate is reacted with an alcohol, a mercaptan, a phenol or a naphthol.

Recently phosphoric acid esters have been found to be of value for insecticidal purposes. Two well-known phosphorus compounds which have been marketed for use as insecticides are Bladan (hexaethyl ester of tetraphosphoric acid) and "Thiophos" (diethyl nitrophenyl thiophosphate). Of late it has been found that phosphate esters having varied alkyl and aryl groups thereon have improved insecticidal properties. By first preparing the tetra alkyl or tetra aryl pyrophosphate and then reacting thereon with an alcohol or a phenol the preparation of phosphates having varied groups therein is facilitated.

The processes heretofore depended on for preparing insecticidal esters of phosphoric acid have ordinarily been one stage processes in which the starting material has been $POCl_3$ or $P_2O_5$ and an alcohol, a phenol or an ether. These processes do not allow the control desired for making phosphate esters having a selected ratio of the various groups therein, such as is possible with the process we have found.

We have found that by using pyrophosphates in the preparation of the neutral phosphoric acid esters that esters can be prepared in which two of the substituents on the phosphorus may be the same and a third substituent thereon can be varied as desired. Our invention in its broadest aspects comprises reacting a tetraethyl, a tetra aryl or a mixed pyrophosphate or pyrothiophosphate with a phenol, a naphthol, a mercaptan or an alcohol. Obviously, the hydroxy compound used can be that corresponding to the alkyl or aryl of the pyrophosphate employed as the starting material. Our invention, however, is particularly useful where the hydroxy compound employed does not correspond to the alkyl or aryl of the pyrophosphate employed in the reaction.

The pyrophosphates employed may be prepared in any known manner. For instance, they may be prepared by reacting a trialkyl phosphate with thionyl chloride or with phosphorus pentoxide. If desired, the pyrophosphate to be employed may be a product resulting from the reaction of $P_2O_5$ and an ether as disclosed in Hull and Snodgrass Patent 2,407,279. Some of the tetra alkyl phosphates which are useful in preparing products in accordance with our invention are tetraethyl pyrophosphate, tetraisopropyl pyrophosphate, tetrabutyl pyrophosphate, or any of the pyrophosphates or pyrothiophosphates of the lower alcohols. Of the tetraaryl pyrophosphates (or pyrothiophosphates) the phenyl and cresyl compounds are especially useful. Also included within the scope of our invention is the use of mixed pyrophosphates (either alkyl-aryl or alkyl-alkyl) such as diethyl diphenyl pyrophosphate, diethyl dipropyl pyrophosphate, triethyl monophenyl pyrophosphate, diethyl dibutyl pyrophosphate and the like.

The alcohols which may be employed in the process in accordance with our invention are any of the lower aliphatic alcohols such as methyl, ethyl, propyl, isopropyl, or butyl. If desired, substituted alcohols may be employed such as ethylene chlorhydrin or a nitroalcohol. Cyclic alcohols such as furfuryl alcohol may be used in the reaction if desired. The phenols which may be employed are either the unsubstituted phenols, such as phenol or cresol or the substituted compounds of this type such as those having nitro or chlorine groups as substituents on the ring. If desired, alpha or beta naphthol may be reacted with the pyrophosphate in preparing phosphate esters in accordance with our invention.

We have found that the reaction of the pyrophosphate (or pyrothiophosphate) with the phenol, alcohol, naphthol or mercaptan takes place at any temperature from room temperature up to the decomposition temperature of the pyrophosphate. The lower temperatures are accompanied by slower rates of reaction but even though a longer time is necessary, decomposition and the formation of by-products is kept to a minimum. At temperatures within the range of 78–100° C. the reaction is ordinarily completed in 1 to 4 hours.

We have found that the products prepared by the process described herein have good insecticidal properties and give results equal or superior to products which are regarded as useful at the present time for insecticidal purposes. Probably the reason for the value of these products as insecticides is that side reactions take place to some extent, thereby incorporating additional phosphorus compounds which contribute insecticidal properties because of their own properties and, also, by their cooperation with the principal products obtained. Ordinarily purification of the resulting products is not desired if these products are to be used for insecticidal purposes. Many of the phosphates produced in accordance with our invention are useful as plasticizers for cellulose esters particularly cellulose acetate or acetate butyrate. For this use or other like uses purification of the products prior to use is desirable.

The following examples illustrate our invention:

*Example 1.*—38 parts of phenol and 118 parts of tetraethyl pyrophosphate prepared by heating together two moles of triethyl phosphate and one mole of thionyl chloride by the method described in U. S. Patent No. 2,495,220 of Bell were heated together for three hours at 80–90° C. The mass was then cooled and the mixture was shaken with water to remove water-soluble material. The mass was finally allowed to stand over night at room temperature, and mixed with water. This treatment completed the removal of any water-soluble material therein. 135 parts of an oil were obtained which is useful directly as an insecticide. A sample of the oil was distilled and the mean fraction thereof consisted of diethyl phenyl phosphate. Upon analysis the phosphorus content was found to be 13.65% as compared to a calculated 13.48%.

The procedure was repeated except that 58 parts of tetra ethyl pyrophosphate and 37.6 parts of phenol were reacted together in the presence of 2 parts of p-toluol sulfonic acid as a catalyst. The final product obtained was an oil essentially like that prepared in the first instance.

*Example 2.*—The oil prepared in Example 1 was heated at 100° C. for three hours with ten times the volume of water. This treatment was for the purpose of hydrolyzing any possible tetraethyl pyrophosphate which remained in the mixture.

*Example 3.*—355 parts of tetraethyl pyrophosphate prepared by reacting triethyl phosphate and phosphorus pentoxide and 120 parts of phenol were heated together at 80–90° C. for three hours. The resulting product was treated as in Example 1. 310 parts of a water-insoluble insecticidal mixture was obtained.

*Example 4.*—290 parts of tetraethyl pyrophosphate were mixed with 139 parts of p-nitrophenol, and the mixture was heated for four hours at 100°. The reaction mixture was then cooled and washed three times with 500 cc. portions of water. After drying under vacuum 239 parts of a product comprised essentially of a mixture of diethyl p-nitrophenol phosphate and ethyl p-nitrophenyl hydrogen phosphate was obtained. This material was useful for insecticidal purposes. This mixture was susceptible to further separation by vacuum distillation if further purification was desired. The product obtained was found to have a boiling point of 126° C. at 0.2 mm. and 133° C. at 0.3 mm. of mercury.

The reaction was repeated using 97 parts of tetraethyl pyrophosphate (made from triethyl phosphate and $P_2O_5$) and 46 parts of p-nitrophenol. The two materials were mixed together and were heated for forty-six hours at 40° C. The entire reaction mixture was found to possess good insecticidal properties. Upon repeating the experiment using additionally 1.5 parts of p-toluol sulfonic acid monohydrate a product of good insecticidal properties was obtained.

The experiment was repeated by mixing 145 parts of tetra ethyl pyrophosphate with 70 parts of p-nitrophenol and allowing the mixture to stand at room temperature for twenty-four hours. Within an hour the p-nitrophenol was all in solution and the reaction was substantially complete. The product was washed with water and there was obtained 190 parts of a water-insoluble insecticidal composition comprising for the most part diethyl p-nitrophenyl phosphate.

*Example 5.*—290 parts of tetraethyl pyrophosphate and 100 parts of ethylene chlorhydrin were mixed together and heated for twenty-four hours at 84–90° C. The mixture was then cooled, 500 parts of benzene were added, and the benzene layer was separated and distilled under vacuum. The benzene and unused ethylene chlorhydrin were thus removed, and there was obtained 115 parts of a mixture of triethyl phosphate and diethyl chloroethyl phosphate and 26 parts of substantially pure diethyl chloroethyl phosphate. By further fractionation the mixture of triethyl phosphate and diethyl chloroethyl phosphate could be separated.

*Example 6.*—322 parts of tetraethyl thiopyrophosphate prepared by heating together 4 moles of triethyl phosphate and 1 mole of $P_2S_5$ at 100–120° C. as described in U. S. Patent No. 2,514,150 of Bell were stirred for several hours at room temperature with 140 parts of p-nitrophenol. The resulting water-insoluble product was washed and dried. 410 parts of an amber-colored liquid was obtained, which liquid was comprised for the most part of a diethyl p-nitrophenyl thiophosphate and had good insecticidal properties.

*Example 7.*—15 parts of tetraethyl pyrophosphate were mixed with 7.2 parts of beta naphthol, and the mixture was heated at 90–100° C. for three to four hours. The product obtained was washed with water and there resulted 18 parts of a water-insoluble oil having as the main product diethyl naphthyl phosphate.

The insecticidal properties of these materials were tested by using a dust consisting of one part of the material in 1000 parts of sulfur as a carrier. Fruit flies were employed for the test. In each case 25 flies were uniformly dusted, the following table showing the kill percentages and the times given:

| Sample | 5 Minutes | 10 Minutes |
|---|---|---|
|  | Per cent | Per cent |
| Example 1 | 100 |  |
| Example 2 | 100 |  |
| Example 3 | 80 | 100 |
| Example 4 | 80 | 100 |

The percentages in the table indicate the percentage of the flies which were dead in the times designated.

We claim:

1. A process for the manufacture of phosphate esters which consists of reacting tetraethyl pyrophosphate with a naphthol.

2. A process for the manufacture of phosphate esters which consists of reacting tetraethyl pyrophosphate with nitrophenol.

3. A process for the manufacture of phosphate esters which comprises reacting a compound selected from the group consisting of the esters of pyrophosphoric acid and thiopyrophosphoric acid with a compound selected from the group consisting of the hydroxybenzenes and the naphthols.

4. A process for the manufacture of phosphate esters which comprises reacting an ester of pyrophosphoric acid with a hydroxybenzene.

5. A process for the manufacture of phosphate esters which consists of reacting an ester of pyrophosphoric acid with a naphthol.

6. A process for the manufacture of phosphate esters which consists of reacting tetraethyl pyrophosphate with a compound selected from the groups consisting of the hydroxybenzenes and the naphthols.

7. A process for the manufacture of phosphate esters which consists of reacting tetraethyl pyrophosphate with a hydroxybenzene.

8. A process for the manufacture of phosphate esters which consists of reacting an ester of pyrophosphoric acid with nitro-phenol.

9. A process for the manufacture of phosphate esters which consists of reacting a tetra alkyl pyrophosphate with a compound selected from the group consisting of the hydroxybenzenes and the naphthols.

10. A process for the manufacture of phosphate esters which consists of reacting a tetra alkyl pyrophosphate with a hydroxybenzene.

11. A process for the manufacture of phosphate esters which consists of reacting tetraethyl pyrophosphate with phenol.

12. A process for the manufacture of phosphate esters which consists of reacting tetraethyl pyrophosphate with beta-naphthol.

ALAN BELL.
KENT C. BRANNOCK.

REFERENCES CITED

The following references are of record in the file of this patent:

UNITED STATES PATENTS

| Number | Name | Date |
| --- | --- | --- |
| 2,402,703 | Woodstock | June 25, 1946 |

OTHER REFERENCES

Clermont, "Annalen der Chemie," vol. 91 (1854), page 375.

Michaelis, "Annalen der Chemie," vol. 164 (1872), page 31.

Arbusow et al., "Jour. fur praktische Chemie," vol. 130 (1941), pages 117, 118, 131.

Fiat Report No. 949, "Organic Chemical Intermediates for Insecticides, Fungicides, and Rodenticides," by J. T. Thurston (pages 19, 20), released May 30, 1947.